Figure 15:
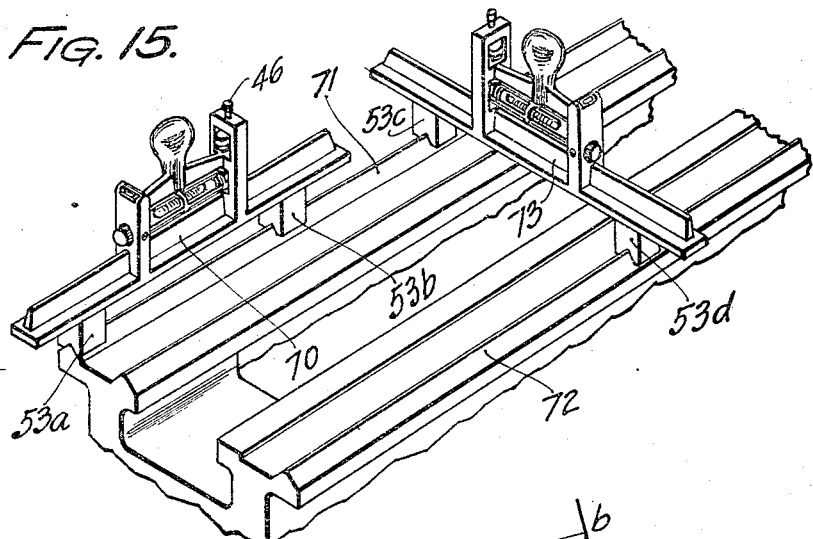

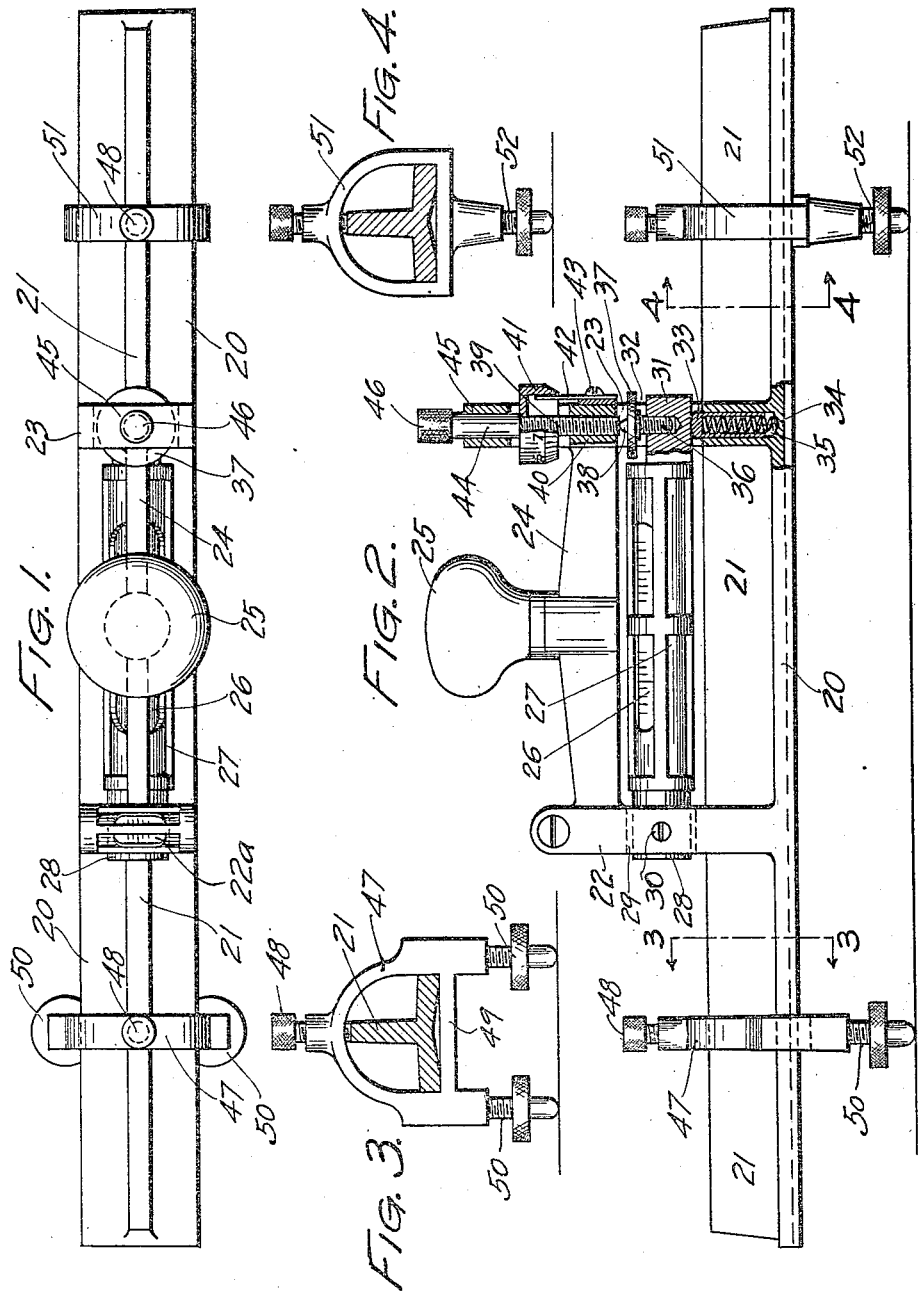

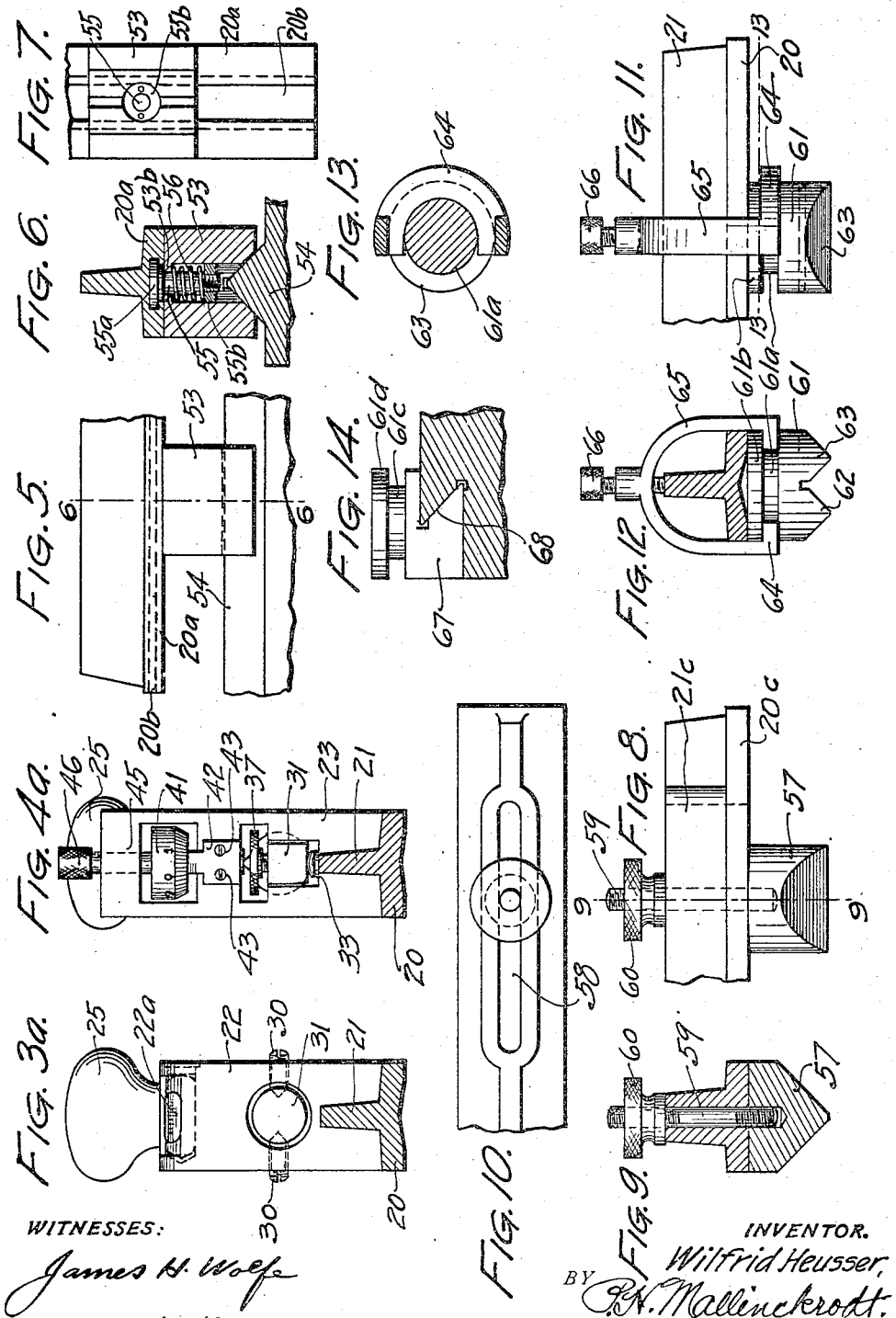

W. HEUSSER.
MICRODEFLECTOMETER.
APPLICATION FILED OCT. 8, 1915.

1,278,148.

Patented Sept. 10, 1918.
3 SHEETS—SHEET 3.

Witnesses
James H. Wolfe
H. Chamberlin

Inventor
Wilfrid Heusser,
By
G. V. Mallinckrodt.
Attorney

UNITED STATES PATENT OFFICE.

WILFRID HEUSSER, OF SALT LAKE CITY, UTAH.

MICRODEFLECTOMETER.

1,278,148.  Specification of Letters Patent.  Patented Sept. 10, 1918.

Application filed October 8, 1915. Serial No. 54,760.

*To all whom it may concern:*

Be it known that I, WILFRID HEUSSER, a citizen of Switzerland, and a resident of Salt Lake City, in the county of Salt Lake and the State of Utah, have invented a certain new and useful Microdeflectometer, of which the following, together with the accompanying drawings, forms a full, clear, and exact specification, which will enable others skilled in the art to which it appertains to make and use the same.

My invention relates to a micro-deflectometer and its objects are:—

First. To produce a highly sensitive instrument for detecting the amount of deviation from a plane, of lines or surfaces, to which the instrument may be applied.

Second. To provide such attachments as shall allow the instrument to be easily applied to irregular surfaces or groups of irregular surfaces, as for example the ways of a lathe or a metal planer.

Third. To reduce the number of separate parts to a minimum, thus promoting the accuracy of the instrument.

Fourth. To provide an instrument of extreme accuracy which shall at the same time be of such simple and rugged construction as shall adapt it to the everyday, practical use of the average metal working shop.

Fifth. To give the utmost accuracy in the instrument at a moderate cost.

In attaining my objects I provide an elongated body-portion preferably in the form of a ribbed straight-edge and made of metal. Two standards spaced a suitable distance apart, project upwardly from the straight-edge and each of the standards supports one end of a level, comprising the usual vial mounted in a suitably constructed housing.

The level is adjustable in the standards and a micrometer is mounted on one of the standards in such a manner that any variations in the position of the level may be accurately noted on the micrometer scale.

To adapt the instrument to special purposes I provide a number of suitably shaped detachable supporting shoes which may be clamped to each end of the straight-edge and greatly extend the usefulness of the instrument.

The features upon which protection is desired are collectively grouped in the appended claims.

In the accompanying drawings:

Figure 1, represents a plan view of the instrument in one of its forms;

Fig. 2, a side elevation thereof;

Figs. 3 and 4, sections taken on the lines 3—3 and 4—4 respectively, in Fig. 2 and in the directions indicated by the arrows;

Figs. 3ª and 4ª, sections taken respectively on the same lines in Fig. 2, as the two previous sections, but viewed in the directions opposed to the arrows;

Fig. 5, a fragmentary side elevation showing a modified type of the detachable shoes;

Fig. 6, a section on line 6—6 in Fig. 5;

Fig. 7, a bottom plan view corresponding to the view shown in Fig. 5.

Fig. 8, a fragmentary side elevation showing a further modified form of the detachable shoes.

Fig. 9, a section taken on the line 9—9 in Fig. 8.

Fig. 10, a top plan view, corresponding to the view shown in Fig. 8.

Fig. 11, a fragmentary side elevation showing a still further modified form of detachable shoes;

Fig. 12, an end elevation partly in section corresponding to the view shown in Fig. 11;

Fig. 13, a section taken on the line 13—13 in Fig. 11 and Fig. 14, an elevation of a shoe for a specific purpose.

Fig. 15, a perspective view illustrating a practical use of the instrument.

Figure 16:
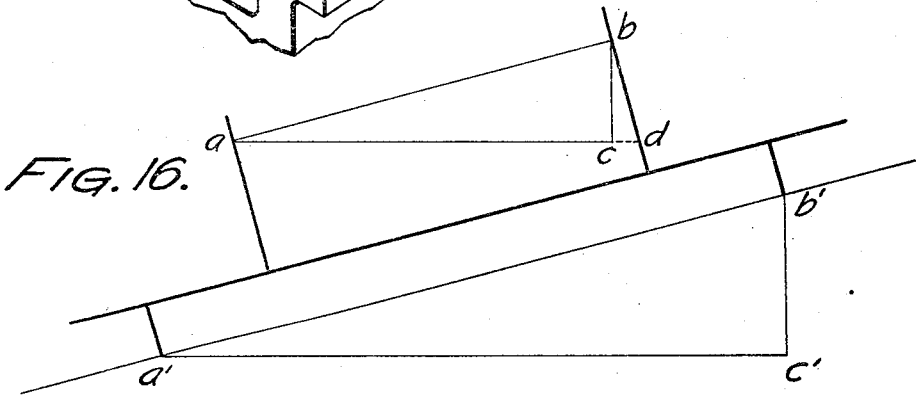
Figures 17, 17A:
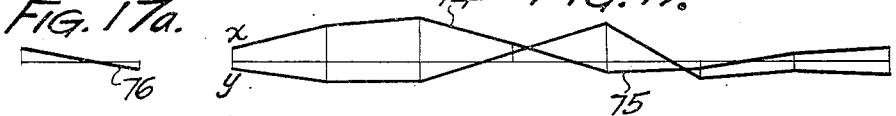

Figs. 16, 17, 17ª, 18 and 19 are diagrams which are referred to hereinafter in explaining the uses of the instrument.

Throughout the different views, similar parts are designated by similar numerals.

Referring to the drawings (20), represents the flange, and (21), the stem or rib of a straight-edge having an inverted T-shaped cross-section. At (22) and (23) are standards projecting from the straight-edge and preferably integral therewith, these standards being connected with each other, near their upper ends, by the integral tie bar (24). A knob (25) which may be fastened to the tie bar (24) in any suitable way is centrally located thereon, for the purpose of enabling the user to conveniently lift the instrument. A level vial (26) of the desired sensitivity is mounted in the vial housing (27) which latter is preferably constructed in accordance with my application for U. S. patent filed April 20, 1915, Serial No. 22,586. The end lug (28) of the housing (27) extends through the opening (29) in the standard (22) and is pivoted therein by the conically pointed screws (30). The opposite end of the housing (27) is provided with the lug (31) extending through the opening (32) in the standard (23). This end of the housing (27) is yieldingly supported by means of a button-headed sleeve (33) which is pressed upwardly by the spring (34) resting in the recess (35) at the bottom of the standard (23). In the upper side of the lug (31,) is a tapped hole adapted to receive the threaded stud (36) projecting downwardly from the disk (37). A rounded tip (38), preferably of hardened steel projects from the upper surface of the disk (37) and the apex of the tip bears against the bottom face of the micrometer screw (39) which engages the threaded portion (40) of the standard (23). The stud (36) forms a primary means for adjusting the level while the micrometer screw 39 forms an auxiliary means of adjustment. The micrometer screw (39) carries the rigidly mounted drum (41) which has on its outer surface a scale graduated in the usual manner as indicated in Fig. 4ª, and the smooth shank (44) above the drum (41) is journaled in the upper portion (45) of the standard (23). The screw (39) may be turned by the fingers of the user by means of the knurled head (46). A strip (42), preferably of metal and having suitable divisions marked thereon is fastened to the standard (23) by means of screws (43) and is so placed that its divisions, in conjunction with the scale on the drum (41) will complete the micrometer in the way that is well known.

Figs. 1, 2 and 3 show a yoke (47) adapted to be slipped over one end of the straight edge and to be clamped thereto by the screw (48) which bears on the top of the rib (21) and causes the bottom of the flange (20) to be forced down upon the connecting bar (49). The yoke (47) rests on two leveling screws (50). Figs. 1, 2, and 4 show a companion yoke (51) to be used with the yoke (47) but on the opposite end of the straight edge and the yoke (51) has only one leveling screw (52). Thus a three point bearing is obtained for the instrument as shown in Figs. 1 and 2.

Figs. 5, 6 and 7 illustrate a supporting shoe (53) having its bottom face grooved in the form of a V to fit the ways (54) of an ordinary lathe. In this case the shoe (53) is attached to the flange (20ª) of the straight-edge by means of the special bolt (55) having the projecting head (55ª) which fits into the T-shaped slot 20ᵇ which latter may extend the full length of the flange (20ª). The shoe (53) is bored to receive a compression spring 56, which exerts its pressure against the annular projection 53ᵇ on the block (53) and against the circular nut 53ᵇ on the bolt 55, thus tending to keep the shoe (53) pressed against the face of the flange 20ª.

Figs. 8, 9 and 10 illustrate a V-shaped supporting shoe (57) adapted to fit the ways (not shown) of an ordinary metal planer. In this instance the flange 20ᶜ and the rib 21ᶜ of the straight-edge are slotted as shown at (58), and the shoe (57) has fastened in it the stem (59) which extends through the slot (58) and at its upper end carries the knurled nut (60). By tightening the nut (60) the shoe (57) is drawn against the face of the flange 20ᶜ.

Figs. 11, 12 and 13 illustrate a combination supporting shoe (61) having the two depending V-shaped projections (62) and (63) which at the same time form a V-shaped groove between them, this groove serving the same purpose as the V-shaped groove illustrated in Fig. 6. In this instance, however, the shoe (61) has the neck 61ª and the head 61ᵇ forming an annular groove which is adapted to receive the semicircular lower portion (64) of the yoke clamp (65). The yoke clamp (65) may be slipped over the flange (20) and the rib (21) of the straight edge in a manner similar to that illustrated in Figs. 1 and 2, and the shoe (61) may be drawn up tightly against the face of the flange (20) by means of the knurled screw (66). Either one of the V-shaped projections 62 or 63 may be used in the same manner as the shoe 57 (Figs. 8 and 9).

The shoe (67) illustrated in Fig. 14, has a V-shaped groove formed in its side as shown at (68) and this groove is adapted to fit one side of the ordinary lathe slide-rest or the table of a milling machine and the neck 61ᶜ and head 61ᵈ are designed to fit into the yoke clamp 65, illustrated in Figs. 11, 12 and 13, in the same way as described in connection with the shoe (61) shown in these figures.

It must be understood that all the special shoes shown in Figs. 5 to 14 inclusive are intended to be used on the straight-edge in pairs, that is, one at each end thereof.

In the top of the standard 22 is a small level vial 22ª for the purpose of approximately leveling the instrument transversely. As illustrated in Figs. 17 and 17ª the line 74 (Fig. 17) represents the contour, greatly exaggerated, of one of a pair of lathe ways and the line 75, the contour, greatly exaggerated, of the other lathe way while the line 76, (Fig. 17ᵃ) represents an imaginary line joining the points *x* and *y* (Fig. 17).

A few cases showing the practical use of this instrument are described in the following paragraphs, but most engineers or mechanics can originate special methods for applying the instrument to their own particular purposes for which reason these descriptions are to be considered merely as suggestions and not as a comprehensive enumeration of all the possible uses of the micro-deflectometer.

*Case No. 1.*—This case covers, probably, the most extensive application of the instrument, namely, for testing the straightness of the beds or ways of ordinary machine tools, such as lathes, planers, grinding machines, etc.

In Fig. 15 the instrument is shown in two different positions on the bed of a lathe, the shoes illustrated in Figs. 5, 6 and 7 being used, which conform to the contours of the ways of the bed. It is assumed that the micro-deflectometer has first been carefully adjusted, which is effected by bringing the zero line on the micrometer drum (41) (Fig. 4ᵃ) into the proper position and causing the axis of the level vial (26) (Fig. 2) to become perfectly parallel to a straight line joining the lower faces of the shoes (53ᵃ) and (53ᵇ) (Fig. 15) by the customary method, the screw 36 being provided for this purpose.

The adjusted micro-deflectometer being placed in the position (70) (Fig. 15) is leveled by means of the micrometer stem (46) and the reading of the micrometer noted. The micro-deflectometer is then moved along the way (71) and the readings taken as close together as the desired accuracy of the case may require. At each setting the micro-deflectometer is again leveled by means of the micrometer stem (46) and the reading of the micrometer noted as before. This process is continued until the entire length of the lathe way or any required part of it, is covered.

The second way (72) (Fig. 15) of the lathe bed may be tested in the same manner as just described and the readings for the two ways may be joined by a cross reading taken with the micro-deflectometer in the position (73) (Fig. 15), each of the shoes having meanwhile been turned through a right angle around the bolt 55 (Fig. 6) so that they occupy the positions 53ᶜ and 53ᵈ shown in Fig. 15. The cross reading may be taken anywhere longitudinally along the lathe ways, though preferably in such a manner that the new reading will join two points already established, one on each of the two lathe ways. The different readings of the micro-deflectometer having been recorded, may now be plotted on paper and a graphical representation be made of the exact condition of the lathe ways as illustrated in Figs. 17 and 17ᵃ the line 74 (Fig. 17) representing one of the lathe ways and the line 75, the other lathe way while the line 76 (Fig. 17ᵃ) represents the cross reading joining the points *x* and *y* (Fig. 17).

By referring to Figs. 2 and 16 it will be noticed that for quantitative results in general, the readings of the micro-deflectometer must be reduced to the basis of the ratio existing between the distance center to center of the fixed supports of the level-vial-housing (27) (Fig. 2) and the distance center to center of the movable main supports (50) and (52) (Fig. 2). This relationship is clearly shown in a greatly exaggerated way by the diagram (Fig. 16) in which it will be noticed that the triangle *abc* is similar to the triangle *a′ b′ c′*, all the sides of the one being parallel to the corresponding sides of the other. In this diagram the line *bc* represents a movement of the micrometer screw 39, (Fig. 2), as recorded on the micrometer scale, and the line *b′ c′* represents the distance from the point *b′*, in the line or surface *a′ b′* being tested, to the point *c′* vertically below *b′*, but lying in the ideally level line or surface *a′ c′*. As a matter of fact, theoretically, the line *bd*, representing the center line of the micrometer does not coincide with the line *bc* but practically the difference *cd* in the positions of the two is so infinitesimal, that we may at all times regard the triangle *abd* as being coincident with the triangle *abc* and therefore as being identical with it.

*Case No. 2.*—For testing the surfaces of plates especially those requiring to be ground truly plane.

The method used for plates is the same as described in Case 1, excepting, that instead of testing only two lines of reading across the face of a plate, as many successive lines of readings must be taken as the required degree of accuracy necessitates. The leveling screws 50 and 52 (Figs. 2, 3 and 4) form convenient supports for the micro-deflectometer when used for testing plates.

Figure 18:

*Case No. 3.*—For testing straight edges. The exact contour of an edge being revealed in a diagram, as for instance the one illustrated in Fig. 18, corrective measures may be taken to secure a perfect edge.

*Case No. 4.*—For ascertaining the precise line of deflection of a beam under stress.

Figure 19:
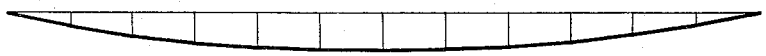

An example is shown in Fig. 19, which represents the diagram of a beam supported at each end and uniformly loaded. The effects of any other system of loading on a beam can also be faithfully recorded in a similar manner.

As the methods of making the diagrams referred to in the cases cited above, are obvious, they will not be further explained.

Having fully described my invention, what I claim as new is—

1. In a micro-deflectometer, the combination with a suitably supported, elongated body-portion, of standards projecting therefrom, a level adjustably carried by the said standards, a micrometer mounted on one of the said standards for indicating movement between the said level and the said body-portion and means for adjusting the said level relatively to the said micrometer.

2. In a deflectometer, the combination with an elongated body-portion of two upwardly projecting standards spaced apart from each other and located intermediate the ends of the said body-portion, a level pivoted in one of the said standards and adjustably held in the second standard; a micrometer suitably mounted on the second standard, for indicating any movement between the said level and the said body-portion, means for adjusting the said level relatively to the said micrometer; and movable supports adapted to be clamped to the said body-portion for the purpose of forming suitable bearings therefor.

3. In a deflectometer, the combination with a suitable straight-edge of two upwardly projecting standards, a level having one end thereof pivoted in one of the said standards, the other end of the said level being movably supported in the second standard, means for maintaining an upwardly-acting yielding pressure on the said other end of the level, and a suitably disposed micrometer adapted to indicate differences in the positions of the movable end of the said level and means for adjusting the said level relatively to the said micrometer.

4. In a deflectometer, the combination with an elongated body-portion, of a level suitably supported thereon, primary means for adjusting the level, relatively to the said body-portion; auxiliary means for adjusting the said level relatively to the said primary means; and a micrometer suitably disposed for indicating the extent of any adjustment between the said primary means and the said auxiliary means.

5. In a deflectometer, the combination with an elongated body-portion, of movable yokes adapted to be clamping thereto, leveling screws suitably disposed in the said yokes for the purpose of adjustably supporting the same, a level and a micrometer mounted in suitable relationship on the said body-portion, and means for adjusting the said level relatively to the micrometer.

6. In a deflectometer having an elongated body-portion, the combination therewith, of two movable yokes adapted to be slipped over the said body-portion, means for clamping the said yokes to the said body-portion; leveling screws suitably disposed in the said yokes for the purpose of adjustably supporting the said body-portion, a level and a micrometer mounted in the proper relationship on the said body-portion, and means for adjusting the said level relatively to the said micrometer.

7. The combination with an elongated body-portion, of a standard projecting therefrom, a micrometer mounted on the said standard, a level adjustably mounted on the said body-portion, an adjusting screw located in one end of the said level and adapted to bear against the movable member of the said micrometer in such a manner that the movement of the level may be controlled and indicated through the micrometer, and means for yieldingly holding the said adjusting screw in contact with the said movable member of the micrometer.

In testimony that I claim this invention as my own, I have signed my name hereto, in the presence of two subscribing witnesses.

WILFRID HEUSSER.

Witnesses:
JAMES H. WOLFE,
P. H. MALLINCKRODT.